US012623509B2

(12) United States Patent
Groben et al.

(10) Patent No.: US 12,623,509 B2
(45) Date of Patent: May 12, 2026

(54) DEVICE FOR MANIPULATING AN ACTUATOR, IN PARTICULAR IN THE FORM OF A THROTTLE OR CLOSURE FLAP, OF AN AIR VENT, AN AIR VENT COMPRISING SUCH A DEVICE AS WELL AS A METHOD FOR MANIPULATING AN ACTUATOR, IN PARTICULAR IN THE FORM OF A THROTTLE OR CLOSURE FLAP, OF AN AIR VENT

(71) Applicant: ILLINOIS TOOL WORKS INC., Glenview, IL (US)

(72) Inventors: Manfred Groben, Gau-Bickelheim (DE); Günther Krämer, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 826 days.

(21) Appl. No.: 17/568,977

(22) Filed: Jan. 5, 2022

(65) Prior Publication Data

US 2022/0212521 A1     Jul. 7, 2022

(30) Foreign Application Priority Data

Jan. 7, 2021     (DE) ..................... 10 2021 100 125.0

(51) Int. Cl.
  *B60H 1/00*       (2006.01)
  *B60H 1/34*       (2006.01)
(52) U.S. Cl.
  CPC ..... *B60H 1/00978* (2013.01); *B60H 1/00428* (2013.01); *B60H 1/00871* (2013.01); *B60H 1/34* (2013.01); *B60H 2001/3471* (2013.01)

(58) Field of Classification Search
  CPC ........... B60H 1/00978; B60H 1/00428; B60H 1/00871; B60H 2001/3471
  (Continued)

(56) References Cited

U.S. PATENT DOCUMENTS 5,823,868 A * 10/1998 Ohkubo ............. B60H 1/00978
                                                    454/121
9,720,204 B2 * 8/2017 Yoo ..................... G02B 27/0006
  (Continued)

FOREIGN PATENT DOCUMENTS

CN       108466530 A * 8/2018
CN       109256908 A * 1/2019 ............... B60H 1/34
  (Continued)

OTHER PUBLICATIONS

Servomotor, Wikipedia online, https://en.wikipedia.org/wiki/Servomotor; retrieved Jan. 5, 2022; 5 pages.

*Primary Examiner* — Allen R. B. Schult
*Assistant Examiner* — Illiam C Weinert
(74) *Attorney, Agent, or Firm* — THOMPSON HINE LLP

(57) ABSTRACT

A device for manipulating an actuator, designed in particular in the form of a throttle valve or closure flap, of an air vent, wherein the actuator is optionally designed as an air-directing element or as part of a package of air-directing elements. The device has a motor-operated, in particular electromotive, drive, which is or can be coupled mechanically to the actuator in such a way that the actuator can be adjusted relative to the housing of the air vent by activating the drive. The device also has a sensor system for, in particular, directly sensing a real actual position of the actuator relative to the housing of the air vent.

16 Claims, 9 Drawing Sheets

(58) Field of Classification Search
USPC ......................................................... 454/204
See application file for complete search history.

(56)                    References Cited

U.S. PATENT DOCUMENTS

| | | | |
|---|---|---|---|
| 2004/0067049 A1* | 4/2004 | Woodward .............. | H02P 25/04 |
| | | | 388/801 |
| 2007/0202793 A1 | 8/2007 | Klingler | |
| 2010/0291853 A1 | 11/2010 | Koshobu | |
| 2021/0138874 A1* | 5/2021 | Srnec ................... | B60H 1/3208 |
| 2021/0402847 A1* | 12/2021 | De Pelsemaeker ......................... | |
| | | | B60H 1/00478 |
| 2022/0080806 A1* | 3/2022 | Lavrich .............. | B60H 1/00771 |

FOREIGN PATENT DOCUMENTS

| | | | | | |
|---|---|---|---|---|---|
| CN | 110949097 A | * | 4/2020 | .............. | B60H 1/34 |
| DE | 10350232 A1 | | 5/2005 | | |
| DE | 102010016949 A1 | | 12/2010 | | |
| DE | 102016105003 A1 | | 9/2016 | | |

* cited by examiner

DEVICE FOR MANIPULATING AN ACTUATOR, IN PARTICULAR IN THE FORM OF A THROTTLE OR CLOSURE FLAP, OF AN AIR VENT, AN AIR VENT COMPRISING SUCH A DEVICE AS WELL AS A METHOD FOR MANIPULATING AN ACTUATOR, IN PARTICULAR IN THE FORM OF A THROTTLE OR CLOSURE FLAP, OF AN AIR VENT

TECHNICAL FIELD

The present invention relates to a device for manipulating an actuator, designed in particular in the form of a throttle valve or closure flap, of an air vent, wherein the actuator is optionally designed as an air-directing element or as part of a package of air-directing elements. The air vent is in particular part of a ventilation system for a vehicle. Furthermore, the invention relates to a ventilation system having such an air vent.

BACKGROUND

The air vents typically used in ventilation devices for vehicles are air vents or air outlet nozzles that enable the exiting air stream to be controlled in a targeted manner. Such air vents are used in order to supply fresh air in particular into a vehicle interior.

The air stream flows through an inlet opening of the air vent into an air duct which is delimited by the housing wall of the air vent, through said air duct, and ultimately through the outlet opening of the air vent into the interior of a vehicle (for example a car or truck). The amount of air entering the interior of the vehicle via the air vent per unit of time can generally be controlled via an actuator, which is for example designed as a throttle valve or closure flap and is provided to be adjustable. Optionally, the actuator can also be designed as an air-directing element or as part of a package of air-directing elements.

Typically, such actuators (ventilator, closure, or throttle flaps) are individually adjusted by hand. Here, it is possible not only to distribute the airflow entering the interior of the vehicle onto the footwell, onto the average height within the vehicle, or onto the windshield for defrosting; rather, such actuators are often also adjustable in order to be able to change, for the purposes of temperature control, the proportion of fresh air flowing in or air cooled by a cooling unit and the amount of ambient air.

A trend in air vent technology can be seen in the fact that air vents are increasingly meant to be activated not only manually, but rather additionally or exclusively motor-operated. For this purpose, it is generally known that a motor, in particular an electromotive drive, is associated with the device for manipulating the actuator of an air vent, which motor is or can be coupled mechanically to the actuator in such a way that, by activation of the motor-operated drive, the actuator can be adjusted relative to the housing of the air vent.

In such motor-manipulable actuators for air vents, there is a fundamental need to be able to detect the position of the actuator actually set by the motor-operated drive. For this purpose, embodiments from the prior art are known in which a stepping motor is used as an electromotive drive, wherein an electronics associated with the stepping motor is designed in order to generate electrical pulses for each predefined rotation angle of the rotor of the stepping motor that is traveled. With the aid of an evaluation apparatus, a rotor position of the stepping motor determined from the electrical pulses generated by the electronics and, indirectly, a position of the actuator are then calculated.

The disadvantage of these known solutions is that not all of the problems of actuators of an air vent that can be manipulated with a motor-operated drive can be considered. Specifically, air vents can be manually adjusted by the user, i.e., by hand, as is customary. If this is the case, the gear mechanism connecting the electromotive drive to the actuator and the electromotive drive are moved without an electrical signal. Thus, the initial output position of the actuator can no longer be determined during a subsequent electrical activation of the motor-operated drive, and the setting of the actuator of the air vent can no longer occur as intended. An automatic adjustment of the actuator of the air vent with the aid of the electromotive drive can thus no longer achieve the set target and largely loses its function.

Another problem that is not considered in the known solutions for electromotive manipulation of the actuator of an air vent can be seen in the fact that the movement of the kinematic parts in an air vent can be inhibited or completely blocked by foreign bodies. For example, this can be mobile phone holders or aerators that can be clipped into the blades of an air vent. If stepping motors are used for the actuation in this case, the electric field of the stepping motor rotates, but the runner or rotor of the stepping motor is not carried along. However, because the electric field is moving, the electronics counts the steps that the stepping motor is supposed to have taken. In this scenario, too, the absolute position of the motor is lost, and the automatic setting function cannot achieve the goal and also largely loses its function.

Worm gear mechanisms could theoretically address this problem. Worm gear mechanisms block a manual adjustment through self-inhibition when they are to be driven from the pinion side, which constitutes a misuse of the mechanics and can lead to its destruction. If the destruction of the worm gear mechanism is prevented by means of a sliding clutch, for example, the result is a false position. This cannot be detected by the control of the stepping motor. Again, the automatic setting function cannot reach the goal and largely loses its function.

In addition, when the worm gear mechanisms are driven on the worm side, their high transmission ratio also results in high torque, which, when the kinematics are blocked with foreign bodies, can in turn lead to destruction of the kinematics. Again and again, for example in the case of stepping motors, it occurs that drive pulses are generated but no movement occurs. These errors also lead to false positions and cannot be detected without a position sensor system.

When using stepping motors, they must learn their real position each time the system is initialized. This is done by turning on limit stops or relatively expensive or complicated contact switches. In the case of air vents with visible blades, this can be undesirable, because the movements of the blades are clearly visible during the calibration process. This problem is also eliminated with position sensors on the drives.

Further, it can be necessary to reduce the number of motors for cost reasons. Through a skillful arrangement, a motor drives a plurality of output shafts of a transfer gear mechanism, which are then assigned to individual functions and drive them in a targeted manner.

In such solutions, small tolerances and play accumulate into large errors over time. In addition, parts that are currently not driven can be adjusted, for example, manually.

All of these effects result in the absolute positions of the output shaft of the transfer gear mechanism becoming unsafely detected, and the resulting false positions cause malfunctions of the air vents.

Moreover, many vehicle manufacturers require the ability to operate blindly for motor vehicle air vents. This means that the vehicle occupants, in particular the vehicle drivers, can find and operate the air vent without taking his or her eye off the roadway and the traffic. This is only possible to a limited extent with the previously known operating concepts for automated air vents. An operability of the automated air vents by hand is therefore also required.

SUMMARY

Based on this situation, the problem of the invention is thus to specify a device for manipulating an actuator of an air vent, which is in particular designed in the form of a throttle valve or closure flap, which allows a motor-operated adjustment or activation of the actuator relative to the housing of the air vent, wherein, however, malfunctions of the air vent due to false positions of the actuator are simultaneously effectively prevented.

This problem applies not only to the manipulation of actuators in the form of a throttle valve or closure flap, but also to the manipulation of an actuator designed as an air-directing element or as part of a package of air-directing elements, for example blades.

With respect to the device for manipulating an actuator of an air vent, this problem is solved according to the invention by the subject matter of independent claim 1, wherein advantageous further developments thereof are specified in the respective dependent claims.

With respect to the air vent, the problem underlying the invention is achieved according to the invention by the subject matter of the parallel claim 14.

Accordingly, the invention relates in particular to a device for manipulating an actuator, designed in particular in the form of a throttle valve or closure flap, of an air vent, wherein the device has a motor-operated, in particular electromotive, drive, which is or can be coupled mechanically to the actuator, for example via a gear mechanism or a coupling mechanism, in such a way that the actuator can be adjusted relative to the housing of the air vent by activating the drive.

According to the present invention, it is provided in particular that the device for manipulating an actuator further comprises a sensor system for in particular directly sensing a real actual position of the actuator relative to the housing of the air vent.

By providing such a sensor system, the real current position (actual position) of the actuator can be sensed by the control apparatus of the motor-operated air vent in a particularly easily realized but effective manner, which is absolutely necessary in order to be able to fulfill the comprehensive function of a fully automated climate control system. The same is true even when the system is disrupted or shut down by external influences.

As already stated at the outset, the invention is not limited to a device for manipulating an actuator of an air vent designed in the form of a throttle valve or closure flap, but also covers the manipulation of actuators that are designed as an air-directing element or as part of a package of air-directing elements. These include, in particular, airflow-directing or airflow-regulating elements, for example air-directing blades or flaps.

The sensor system of the device according to the invention can comprise per airflow-directing or airflow-regulating actuator, for example, a position sensor, which is arranged as an absolute value sensor on a shaft associated with the function or the subsequent activating elements (connecting or coupling rods, levers, etc.) [or] a position that can be clearly assigned to this actuator. This information flows back into a control apparatus of the air vent with the result that a new position can then be approached or an old position can be resumed precisely from the respective position of the airflow-directing or airflow-regulating actuator.

With such an exact position detection, a programming of a corresponding air vent or an arrangement of air vents can be easily realized. The values of the position detection sensed via the sensors can then be stored as new setpoint values in the control apparatus.

In particular, according to exemplary embodiments of the device according to the invention, a control apparatus is accordingly provided for actuating the motor-operated drive according to a command which has been defined previously or input manually via an interface and corresponds to a setpoint position of the actuator, wherein the control apparatus is designed in order to compare the actual position of the actuator, sensed by the sensor system, with the setpoint position and, if appropriate, to actuate the motor-operated drive in such a way that the actual position corresponds to the setpoint position, if appropriate in a certain (narrow) tolerance range.

As an interface for manually entering a command corresponding to a setpoint position of the actuator, an operator device for generating a control signal is considered, in particular, which device comprises an operator interface with a sensory sub-region for receiving an operator action of a user and a control apparatus. The control apparatus can in particular be used in order to generate a corresponding control signal, wherein the control signal describes a function to be performed by the electromotive drive as a function of the operator action, for example, an adjustment of the actuator or a resetting of the actuator to an original position or a predefined starting position.

For example, a guide element of the operator interface of the operator device can have a predefined shape raised from a plane of the user interface and haptically perceptible by a body part of the user performing the operation, wherein the guide element can be designed as a sensor apparatus, which is particularly suitable for blind operation. Of course, however, other embodiments for an interface for manually inputting a command corresponding to a setpoint position of the actuator are also possible.

According to advantageous further developments of the device according to the invention, an apparatus for performing functional monitoring of the motor-operated drive is provided, wherein this apparatus is designed in order to interrupt actuation of the motor-operated drive, to cancel it, or to act on actuation of the motor-operated drive if, —in particular after a predefined or definable time period has elapsed—the actual position of the actuator sensed by the sensor system does not correspond to a predefined setpoint position or does not occur in a predefined or definable tolerance range around the setpoint position. In this context, it is conceivable that a corresponding interface is assigned to the apparatus for performing functional monitoring in order to output a status and/or warning message, in particular optically or acoustically, to the user, if necessary.

Alternatively or additionally for this purpose, the device according to the invention for manipulating an actuator of an air vent can comprise an apparatus for performing functional monitoring of the motor-operated drive, wherein this apparatus for performing functional monitoring is designed in order to detect a manually effected adjustment of the actuator relative to the housing of the air vent with the aid of a sensor system.

In this context, for example, it is conceivable for a control apparatus to be provided in order to drive the motor-operated drive according to a command that is predefined or manually input via an interface and corresponding to a setpoint position of the actuator.

The control apparatus is designed in order to initiate preferably automatically and more preferably optionally automatically predefined or definable measures on the basis of the detection of a manual adjustment of the actuator relative to the housing of the air vent. These predefined or definable measures are, for example, an actuating of the motor-operated drive such that the actuator is (again) reset to a predefined or definable setpoint position, in particular specifically either immediately, i.e., directly, or only after a predefined or definable time period or after a predefined or definable event occurs.

Alternatively, it is also conceivable that the control apparatus is designed in order to automatically and more preferably optionally automatically drive the motor-operated drive in such a way, preferably on the basis of the detection of a manual adjustment of the actuator relative to the housing of the air vent, that the actuator is not reset in a predefined or definable setpoint position, with the result that the manual adjustment of the actuator relative to the housing of the air vent device (at least transitionally) is accepted by the control apparatus.

Deactivation of an automatic resetting of the actuator to a predefined or definable setpoint position is preferably applicable until, for example manually by activating and in particular by pressing an operator control element, the deactivation of this function is cancelled.

In this context, it is conceivable that the control apparatus is designed in order to learn and save the predefined or definable setpoint position of the actuator and/or the actuating of the motor-operated drive that is necessary in order to reset the actuator to the predefined or definable setpoint position by the detection of a manually effected adjustment of the actuator carried out with the aid of the sensor system, in particular in an initial learning process, i.e., for example, during initial commissioning of the ventilation system.

According to realizations of the device according to the invention, it is provided that the apparatus for performing functional monitoring is designed in order to sense manual movement of the motor-operated drive effected by manual adjustment of the actuator.

For example, this can be sensed by detecting and evaluating a voltage induced by the drive during a manual movement of the motor-operated drive or by sensing a current correspondingly generated by the drive during manual movement of the motor-operated drive.

In this regard, it is conceivable that the apparatus for performing functional monitoring of the motor-operated drive is designed in order to determine an actual position of the actuator relative to the housing of the air vent on the basis of the voltage induced by the motor-operated, in particular electro-motive, drive, during a manual movement of said drive, and sensed by the apparatus for performing functional monitoring, or on the basis of the corresponding current.

With regard to the sensor system, which is used in particular for directly sensing a real actual position of the actuator relative to the housing of the air vent, different realizations come into consideration.

For example, it is conceivable that the sensor system has a rotary potentiometer which can be rotated through 360°, wherein an angle range which cannot be sensed by the rotary potentiometer preferably corresponds to an angle range which is either not approached or traveled through by the actuator.

Alternatively, it is conceivable that the sensor system comprises a Hall sensor element, which in turn comprises at least two Hall elements, each with a measuring direction which is perpendicular to the other. The two Hall elements are advantageously attached to the side of a shaft, via which the motor-operated drive is mechanically coupled to the actuator, so that the shaft can transmit rotational movements past the at least two Hall elements.

The two Hall elements can be combined in one assembly. Alternatively, however, it is also conceivable that the two Hall elements are present individually and are in particular arranged in other regions of the shaft.

In a further development of the last mentioned embodiment, it is provided that the Hall sensor element is designed in order to detect a magnet with respective North and South poles, wherein the magnet is located on or in the shaft or surrounds the shaft as an annular magnet, with the result that any position of the shaft can be recorded as an absolute value on the basis of the values acquired with the at least two Hall elements.

According to an easily realized but nevertheless particularly effective embodiment, the motor-operated drive has a stepping motor, in particular in the form of an electronically commutating electric motor which is connected to a gear mechanism which comprises a gear mechanism component for converting a rotary movement of the rotor of the stepping motor into a translatory movement. In this context, it is conceivable for the sensor system to comprise an absolute value sensor that is designed in order to detect an advancing distance of the gear mechanism component.

In this embodiment, it is generally conceivable that the stepping motor itself can be free of sensors. The sensor system, and in particular the absolute value sensor associated with the sensor system, should be connected to a control apparatus.

However, alternatively, it is also conceivable that the sensor system is designed in order to output at least one electrical pulse for each predefined rotational angle of the rotor of the stepping motor that is traveled or for each predefined distance of travel of the gear mechanism component. It then lends itself to provide an evaluation apparatus, which is designed in order to determine an actual value of the rotor position of the stepping motor or an actual value of a distance position of the gear mechanism component from the absolute value information of the absolute value sensor and to compare this actual value of the rotor position of the stepping motor or the distance position of the gear mechanism component to a setpoint position that is externally specified or specifiable.

In addition, it lends itself to further provide a control apparatus, which is designed in order to correct the rotor position of the stepping motor determined from the electrical pulses outputted by the motor electronics or motor control or the traveled distance determined from the electrical pulses outputted by the motor electronics or motor control with respect to the actual value of the rotor position of the stepping motor or with respect to the actual value of the distance position of the gear mechanism component.

In order to make the actuator of the air vent also be manually activatable in the customary manner, according to embodiments of the invention, a manually activatable activating element is provided, which is designed in order to be able to at least indirectly activate the actuator of the air vent manually. In this embodiment, the sensor system is designed in order to convert a manual activation of the activation element and/or a manually set position of the activation element into a virtual position of the actuator relative to the housing and to actuate the motor-operated drive in such a way that the actual position of the actuator sensed with the sensor system corresponds to the virtual position of the actuator specified by means of the activation element.

In other words, in this embodiment, the sensor system is designed in order to sense an actuator position "desired" by the operator of the air vent via the manual activation of the activation element. The desired position of the actuator can then be adjusted by actuating the motor-operated drive with the aid of a corresponding evaluation and/or control apparatus.

Alternatively or additionally, it is conceivable that the evaluation apparatus is designed in order to accept, correct, or reset, on the basis of predefined or definable criteria, the virtual position of the actuator specified by means of the activation element, wherein the predefined or definable criteria depend, in particular, on an operating mode of the air vent.

Stated another way, when the evaluation apparatus senses that the virtual or "operator-desired" position of the actuator relative to the housing of the air vent is either not approachable or it is not possible for other reasons, or it does not make sense to move to this position, the evaluation apparatus can either correct the virtual position of the actuator desired by the operator, i.e., specified by the activating element, or even ignore or reset it.

In this respect, it is generally advantageous when a corresponding synchronization system is provided in order to synchronize an instantaneous position of the (manually activatable) activating element with the position of the actuator, which is ultimately actually set by the motor-operated drive.

In a further, simpler embodiment, the operator can directly mechanically move the actuator manually. A manually introduced movement can then be detected via attached sensors in the setpoint-to-actual comparison (actual value changes, without changing the setpoint value) and—as described above—evaluated.

Relative or incremental sensors are suitable for detecting blockades and/or end stops. In order to detect the position of an actuator after switching on of, for example, the air vent, sensors that output an absolute position instead of a relative value are recommended, e.g., potentiometers, double Hall sensors, at least one and preferably a number of light barriers or absolute value encoders that read multiple bits, capacitive sensors, etc.

According to embodiments of the solution according to the invention, the sensor system has at least one absolute value sensor, wherein the motor-operated drive is assigned an activating element which is coupled to the actuator to be manipulated, wherein, when the motor-operated drive is activated, an adjustment movement of the activating element can be forcibly brought about. In this embodiment, the at least one absolute value sensor is in particular designed in order to directly sense an absolute position of the activating element.

Alternatively or additionally, it can be provided that the sensor system comprises at least one absolute value sensor, which is arranged at or in the region of the actuator to be manipulated and is designed in order to directly sense an absolute position of the actuator relative to the housing of the air vent. In these aforementioned embodiments, the absolute value sensor is in particular designed as an absolute angle sensor or as an absolute travel sensor.

According to embodiments of the device according to the invention, the motor-operated drive is mechanically coupled via a gear mechanism to the actuator to be manipulated via the motor-operated drive. In one variant, the gear mechanism is designed to be true-to-slope.

As already stated, the absolute value sensor is advantageously designed as an absolute angle sensor for assessing the revolution of the gear mechanism associated with the motor-operated drive or for assessing a relative position of the actuator with respect to the housing of the air vent. When the absolute value sensor which is designed as the absolute angle sensor is designed in order to assess the revolution of the gear mechanism, angle information regarding the gear mechanism can be clearly determined from the revolutions of the gear mechanism, from which the position of the actuator relative to the housing of the air vent can be concluded.

For example, it is conceivable that the absolute angle sensor can be designed as a multi-turn absolute angle sensor. Such a multi-turn absolute angle sensor provides angle information greater than 360 degrees of the rotating gear mechanism. This absolute angle information is associated with an angle information of the rotor of the motor-operated drive, because there is a fixed relationship between the revolution of the rotor of the motor-operated drive and the rotational movement of the gear mechanism.

In one variant, the absolute value sensor is designed as a linear travel sensor for direct detection of the advancing distance of the gear mechanism component. Either an angle information greater than 360 degrees of the rotor of the motor-operated drive or a position of the actuator relative to the housing of the air vent can also be obtained from such a detected linear advancing movement, because the ratio of the revolutions of the gear mechanism component to the advancing movement is assumed to be constant. The rotor position of the rotor of the motor-operated drive can be captured by dividing the absolute travel path information of the linear travel sensor by 360 degrees, wherein the broken portion of the result corresponds to the angle of the rotor.

In one embodiment, the gear mechanism component is designed as a threaded spindle, wherein a thread pitch of the threaded spindle is designed such that a number of revolutions of the motor-operated drive is constant over a specified advancing distance of the threaded spindle.

Finally, it should be mentioned as advantageous that the absolute value sensor can detect an advancing movement of a gear mechanism component of the true-to-slope gear mechanism from which the rotor position of the motor-operated drive is determined. This ensures that, when the output signal is evaluated, a mechanical play does not have any influence on the measurement result, and thus a highly accurate measurement result is always given. By using a true-to-transmission-ratio/true-to-slope gearing system, errors in the calculation of the rotor position of the motor-operated drive or in the position of the actuator relative to the housing of the air vent are prevented. Alternatively or additionally, the motor-operated drive should in particular also be coupled to the actuator in a play-free manner via a corresponding mechanism, for example a gear mechanism.

Although the aforementioned embodiments have been described among other things in connection with motor-operated drives which are designed as step motors, an actuating or manipulation of the actuator is generally also possible with other motors. In drives with, for example, switchable gear mechanisms, an accumulating play and accumulating tolerances can become uncomfortably noticeable at a position of the motor known per se with significant positional inaccuracies. In such a case, the real position of the actuator should be sensed with a sensor on the output or on the airflow-directing or airflow-regulating actuator, and possibly corrected, in order to ensure unrestricted function.

In drives that only drive in one direction, the installation of absolute value sensors also makes sense, because no limit stops can be approached for calibration (otherwise one would have to be able to drive away from the limit stop in the other direction).

In drives with a position specification, for example, stepping motors, a manual adjustment or a blocking of the system can be immediately detected by position sensors on the output. An overload of the system can thus be detected and avoided with corresponding measures of control engineering.

The manual adjustment can also be planned as an additional option. On the one hand in order to ensure a blind operation of the air vent, on the other hand also for operation by persons who are not familiar with the operation of the air vent.

According to embodiments of the device according to the invention, the sensor system is integrated in the motor-operated drive designed as a stepping motor when said stepping motor is positively connected to the functional elements. Ideally, the sensor system or a position sensor of the sensor system is positioned directly on a shaft of the actuator, which consists for example of the motor and gear mechanism. Inferences can then be drawn about the position of the airflow-directing or airflow-regulating actuator via the shaft positions. A precondition here is a coupling of the actuator with the airflow-directing or airflow-regulating actuator, which is as free of play and low-deformation as possible.

Equipped with an absolute value sensor system, the electromotive drive can still achieve a desired end position even if it has been moved by an external force in the meantime and the last position stored in a control electronics has thereby changed. The real position (actual position) is then determined via the position sensor system and passed on to a control apparatus.

If, for example, an automatically controlled air vent is blocked by a foreign body, the control apparatus provides the signal to the electromotive drive to move without actually rotating it. In such a case, the continued energizing of the electromotive drive results in significant heating of the same, which can lead to damage to the electromotive drive.

If the feedback to the control apparatus to the effect that the motor is not actually rotating is then carried out via the position sensor system of the electromotive drive, the power supply can in this case be switched off, and the motor can be protected. Via a display, the vehicle occupant can additionally be given the information that the air vent's movement space is not free and that a body may possibly be impeding the movement.

If an error occurs in the step count, this can also be corrected by the information coming from the position sensor system. A precondition for an arrangement of the sensor system directly in or on the motor is a kinematics that is as free of play and low-deformation as possible, so that the position of the elements at the end of the kinematic chain is still achieved with certainty and repetitive accuracy.

The invention further relates to a corresponding method for manipulating an actuator, designed in particular in the form of a throttle valve or closure flap, of an air vent, wherein the actuator is optionally designed as an air-directing element or as part of a package of air-directing elements, and wherein the method comprises the following method steps:

i) outputting a command for activating or starting a motor-operated, in particular electromotive, drive, which is or can be mechanically coupled to the actuator in such a way that the actuator can be adjusted relative to the housing of the air vent by activating the drive, and in particular direct sensing of a real actual position of the actuator relative to the housing of the air vent with the aid of a sensor system;

ii) interrogating a setpoint position of the actuator relative to the housing of the air vent from a memory device which is assigned to the control apparatus; and iii) comparing the sensed actual position of the actuator relative to the housing of the air vent with the interrogated setpoint position of the actuator relative to the housing of the air vent.

In the method according to the invention, it is provided, in particular, that when the result of the comparison in step iii) reveals that the actual position corresponds to the setpoint position, or corresponds at least substantially thereto, the motor-operated drive is stopped, wherein when the result of the comparison in step iii) reveals that the actual position does not correspond at least sufficiently to the setpoint position, a further stepping signal is output to the motor-operated drive and the step iii) is repeated, specifically until the actual position corresponds sufficiently to the setpoint position and the motor-operated drive is stopped.

Alternatively, the method is characterized, in particular, in that in step iii) a number of possibly still necessary motor steps of the motor-operated drive is calculated or determined on the basis of the result of the comparison of the sensed actual position of the actuator with the interrogated setpoint position of the actuator, in order to make the actual position of the actuator correspond to the setpoint position of the actuator, or correspond at least substantially thereto, wherein the calculated number of possibly still necessary motor steps is subsequently output as a signal to the motor-operated drive, in order to manipulate the actuator correspondingly.

BRIEF DESCRIPTION OF THE DRAWINGS

An exemplary embodiment of the solution according to the invention is described in greater detail in the following, with reference to the drawings.

The following are shown.

DETAILED DESCRIPTION

Figure 1:
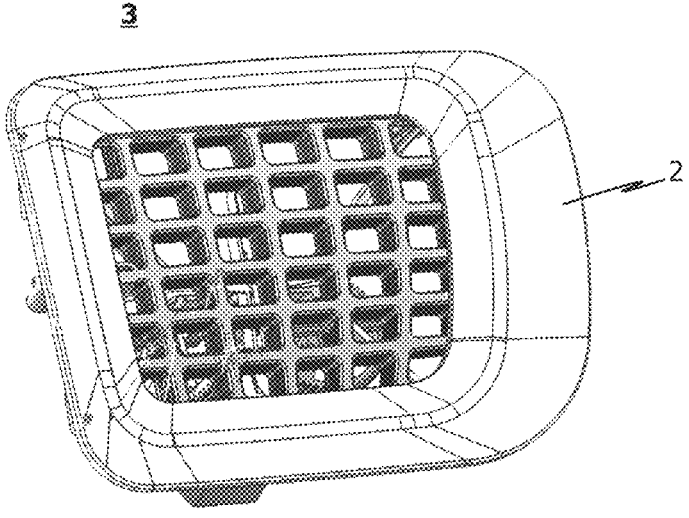
FIG. 1 schematically and in an exterior view, an exemplary embodiment of an air vent according to the present invention.

A first exemplary embodiment of the air vent 3 according to the invention is described in greater detail in the following with reference to the drawings in FIG. 1 to FIG. 3.

The air vent 3 is equipped with a variant of the device according to the invention for manipulating airflow-directing or airflow-regulating actuators. In the embodiment shown in the drawings, these airflow-regulating or air-flow-directing actuators are actuators for bringing about air deflection.

Figure 2:
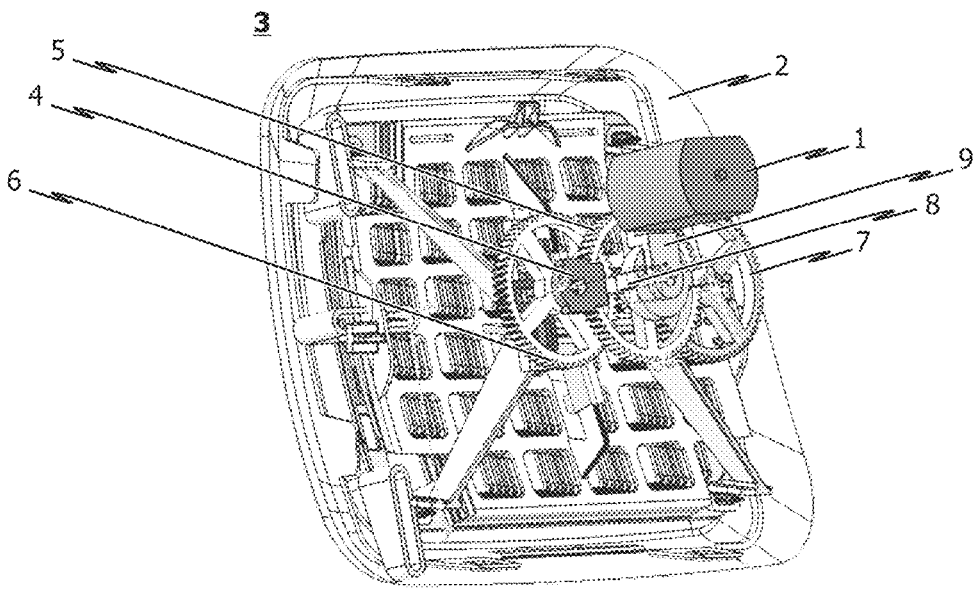
FIG. 2 the exemplary embodiment of the air vent according to the invention according to FIG. 1 in an isometric view from the rear.
Figure 3:
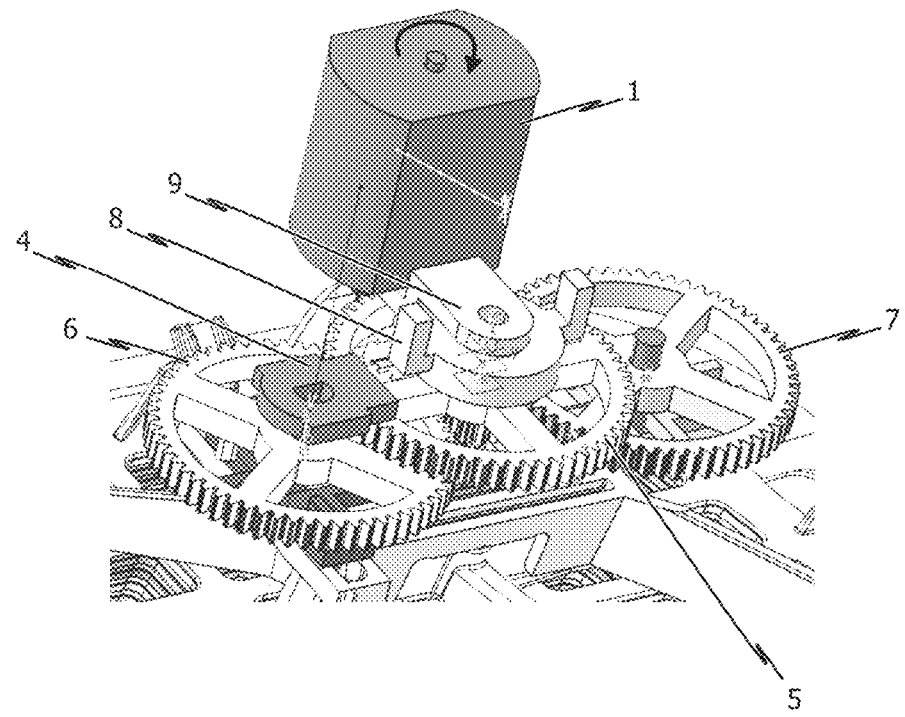
FIG. 3 a detailed view of an excerpt from FIG. 2.

As can be seen in particular in the drawings in FIG. 2 and in FIG. 3, a motor-operated drive 1 in the form of an electric motor is used for this purpose, which is mechanically coupled with the airflow-directing or airflow-regulating actuators to be manipulated in such a way that the actuators can be adjusted relative to the housing 2 of the air vent 3 by activation of the drive 1.

In addition, a sensor system 4, which is to be described in greater detail below, is used, which is designed in order to sense a real actual position of the airflow-directing or airflow-regulating actuators relative to the housing 2 of the air vent 3.

In detail, in the embodiment shown, the electromotive drive 1 is coupled to corresponding activating elements via a gear mechanism, wherein these activating elements are further coupled to the airflow-directing or airflow-regulating actuators to be manipulated. The gearing mechanism can be seen in detail from the illustration in FIG. 3.

Specifically, the gearing mechanism comprises a first gearwheel 5, with which the electromotive drive 1 directly cooperates.

In addition, a second and a third gearwheel 6, 7 are used. Air deflection with the aid of the airflow-directing or airflow-regulating actuators in a first, for example horizontal direction can be realized via the second gearwheel 6, while air deflection using the airflow-directing or airflow-regulating actuators in a perpendicular second direction, for example a vertical direction, is possible via the third gearwheel 7.

For example, when the motor 1 rotates in the direction of the arrow, the first gearwheel 5 is driven accordingly. A brake 8 then generates a reaction torque as a result of which the drive 1 is also rotated with a lever 9, the brake 8, and the first gearwheel 5 in the direction of the arrow, and specifically until the small gearwheel of the drive element of the drive 1 drives the second gearwheel 6. The airflow-directing or airflow-regulating actuators, which can bring about air deflection in the first, for example horizontal direction, are thus shifted up or down accordingly.

In the exemplary embodiment, a sensor system 4 in the form of a potentiometer is further used, which senses the position of the second gearwheel 6 and thus also the adjusted air deflection.

The same applies to the rotation of the motor 1 counter to the arrow; however, a potentiometer on the other side is not shown here, for reasons of clarity.

Figure 4:
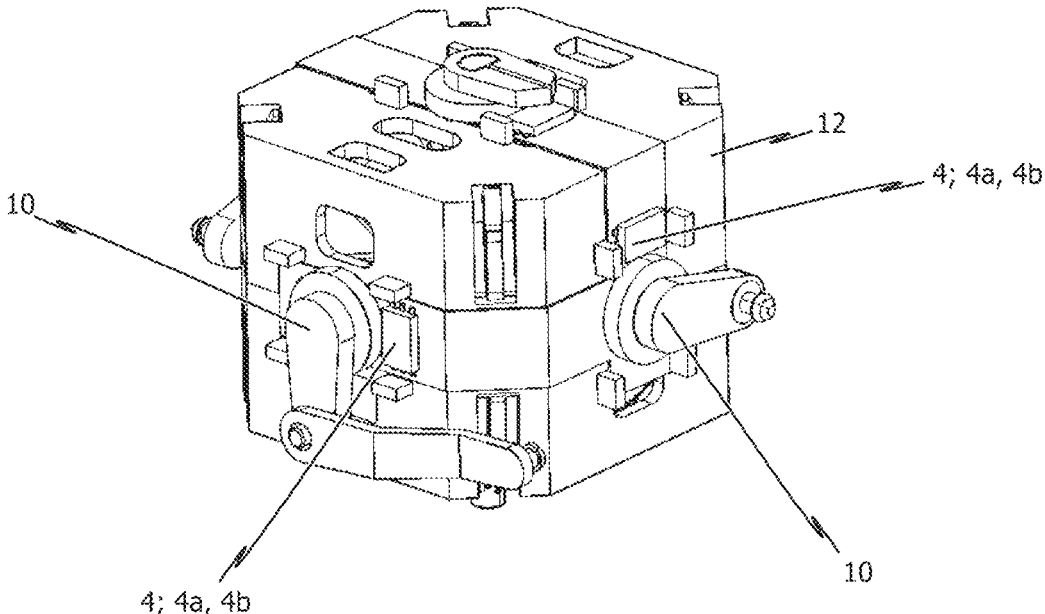
FIG. 4 schematically and in an isometric view, an embodiment of a device for manipulating an actuator of an air vent.

FIG. 4 shows schematically and in an isometric view an exemplary embodiment of a device for manipulating an actuator, wherein the actuator itself is not shown in FIG. 4. The device overall comprises a housing 12 in which an electromotive drive is accommodated.

In FIG. 4, several output shafts 10 are discernible, which are guided out of the housing 12 of the device and coupled to the electromotive drive inside the housing 12.

Each shaft 10 is associated with a sensor system 4, via which the rotational position of the respective shaft 10 and thus a real actual position of an actuator operatively coupled to the shaft 10 can be detected.

In the embodiment shown in FIG. 4, the sensor system 4 comprises a Hall sensor element, which in turn comprises at least two Hall elements 4a, 4b, each with a measuring direction which is perpendicular to the other. The Hall elements 4a, 4b are each attached to the side of the respective shaft 10, so that the shaft 10 can transmit rotational movements past the at least two Hall elements 4a, 4b.

It is provided that the Hall sensor element is designed in order to detect a magnet 11 (cf. FIG. 5A) with respective North and South poles, wherein the magnet 11 is located on or in the shaft 10 or surrounds the shaft 10 as an annular magnet, with the result that any position of the shaft 10 can be recorded as an absolute value on the basis of the values acquired with the at least two Hall elements 4a, 4b.

Figure 5A:
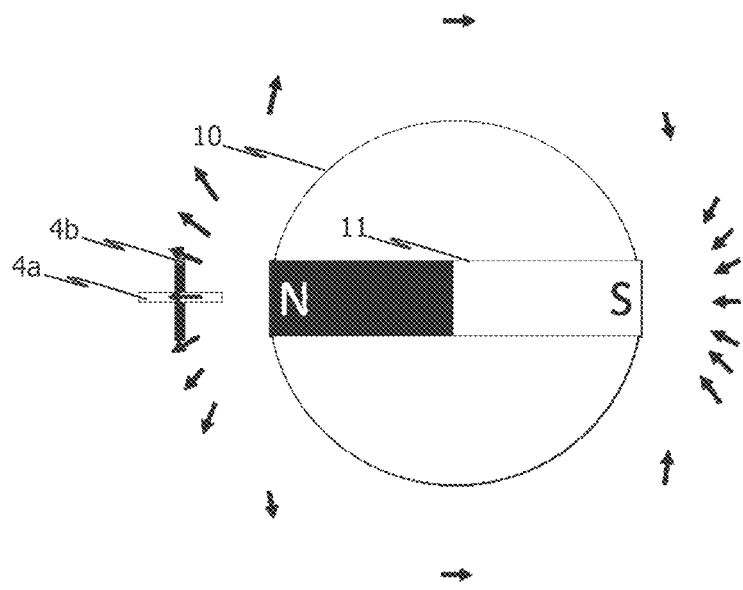
FIG. 5A schematically, the functionality of a first embodiment of a Hall sensor element used as a sensor system in the device according to FIG. 4.

In FIG. 5A, the functionality of such a Hall sensor element is shown schematically. In the embodiment shown in FIG. 5A, the magnet 11 is integrated in the shaft 10, wherein the magnetic field lines are indicated schematically with the aid of the arrows. Moreover, in FIG. 5A, the two Hall elements 4a, 4b are schematically indicated, each with a measuring direction which is perpendicular to the other.

Figure 5B:
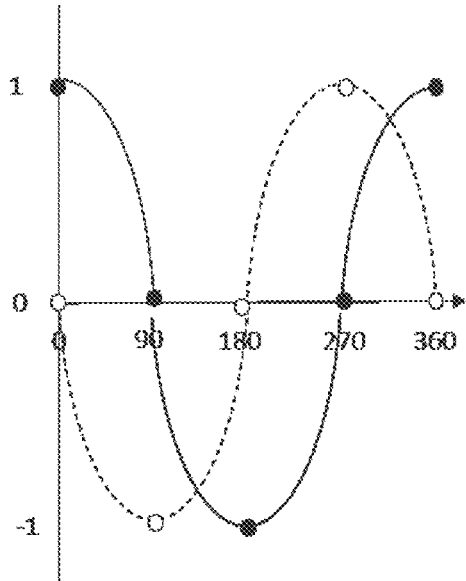
FIG. 5B schematically, the measurement values detectable with the Hall elements of the Hall sensor element according to FIG. 5A for identifying a clear position of a shaft of the device according to FIG. 4.

In FIG. 5B, it is shown which values the respective Hall elements 4a, 4b record upon rotation of the shaft 10 by 360 degrees. Here, the solid line shows the values of the vertically standing Hall sensor 4a, while the dashed line represents the values of the horizontally standing Hall sensor 4b.

Based on the measurement signals of the two Hall elements 4a, 4b, a clear position of the shaft 10 and thus also of the actuator in the figurative sense can be assigned to each pair of values.

It is provided that the Hall sensor element is designed in order to detect a magnet 11 (cf. FIG. 5A) with respective North and South poles, wherein the magnet 11 is located on or in the shaft 10 or surrounds the shaft 10 as an annular magnet, with the result that any position of the shaft 10 can be recorded as an absolute value on the basis of the values acquired with the at least two Hall elements 4a, 4b.

Figure 5C:
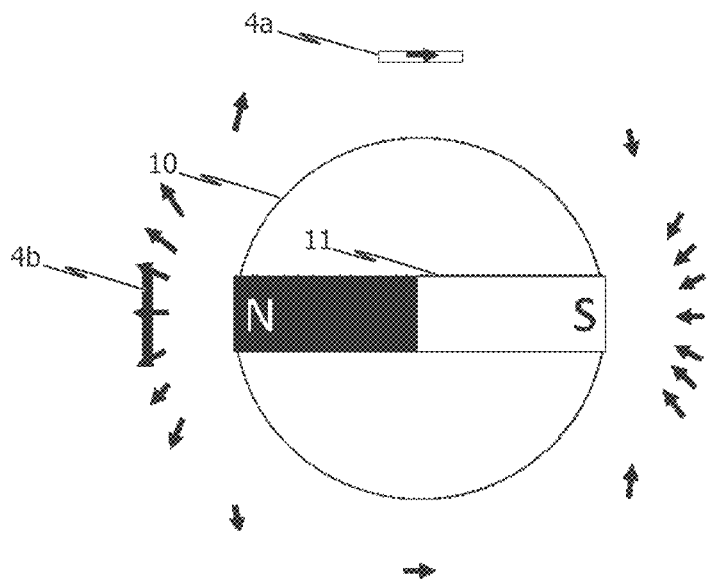
FIG. 5C schematically, the functionality of a second embodiment of a Hall sensor element used as a sensor system in the device according to FIG. 4.

FIG. 5C, the functionality of an alternative embodiment of a corresponding Hall sensor element is shown schematically. In the embodiment illustrated in FIG. 5C, as in the embodiment according to FIG. 5A, the magnet 11 is integrated in the shaft 10, wherein the magnetic field lines are indicated schematically with the aid of the arrows. Moreover, in FIG. 5C, the two Hall elements 4a, 4b are schematically indicated, each with a measuring direction which is perpendicular to the other.

By contrast to the first embodiment according to FIG. 5A, it is provided in the second embodiment of the Hall sensor element shown schematically in FIG. 5C that the two Hall elements 4*a*, 4*b*, each with a measuring direction which is perpendicular to the other, are not arranged in the same region on the shaft 10. Rather, the Hall elements 4*a*, 4*b* are provided at different peripheral regions in the region of the shaft 10.

Figure 5D:
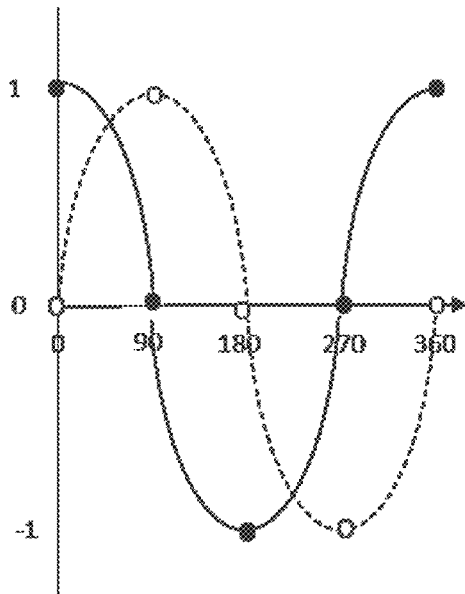
FIG. 5D schematically, the measurement values detectable with the Hall elements of the Hall sensor element according to FIG. 5C for identifying a clear position of a shaft of the device according to FIG. 4.

In FIG. 5D, it is shown which values the respective Hall elements 4*a*, 4*b* record upon rotation of the shaft 10 by 360 degrees. Here, the solid line shows the values of the vertically standing Hall sensor 4*a*, while the dashed line represents the values of the horizontally standing Hall sensor 4*b*.

As in the first embodiment according to FIG. 5A and FIG. 5B, based on the measurement signals of the two Hall elements 4*a*, 4*b*, a clear position of the shaft 10 and thus also of the actuator in the figurative sense can again be assigned to each pair of values.

Figures 6, 7:
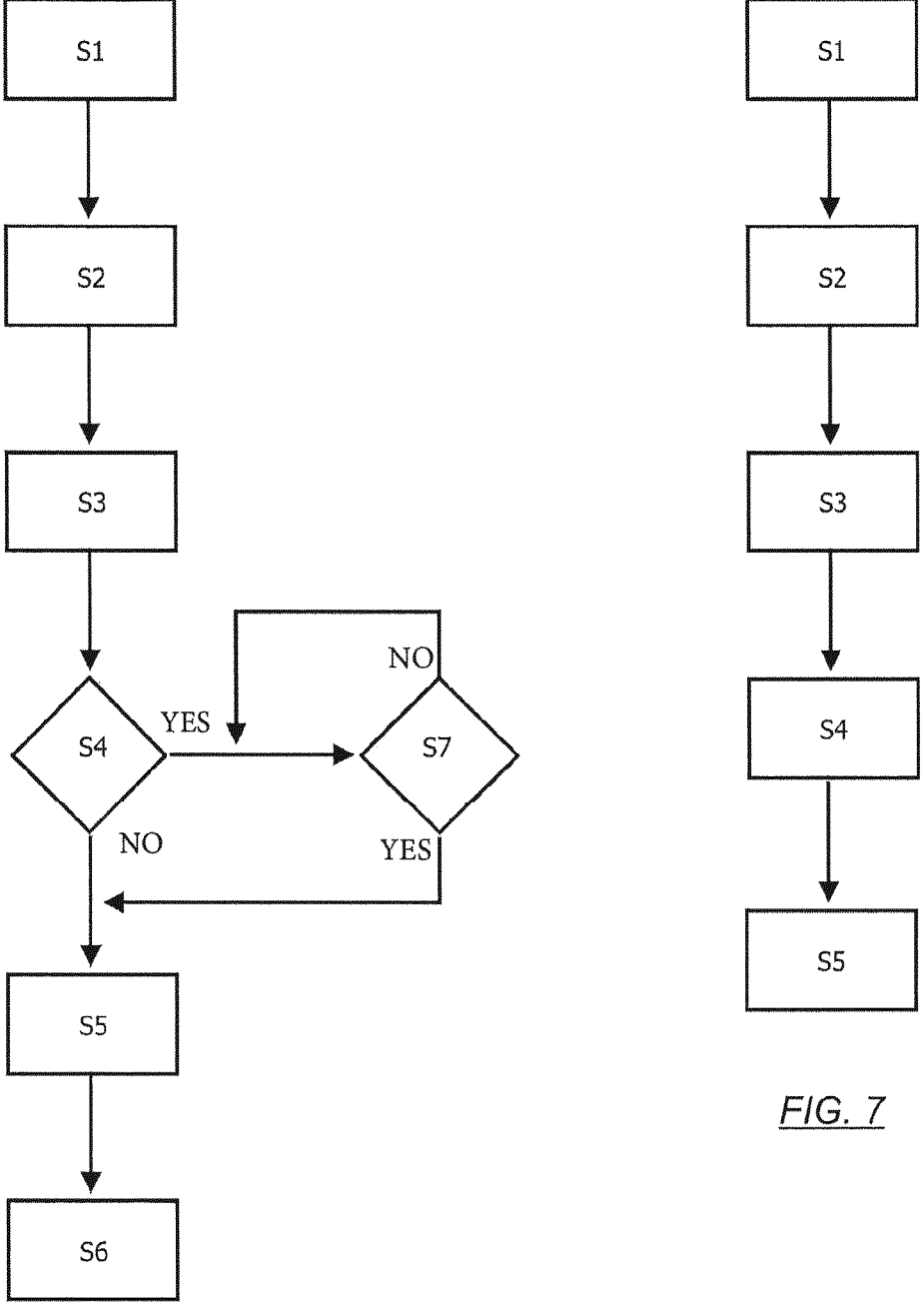
FIG. 6 schematically, a flowchart for an indirect manual adjustment of the actuator of an air vent.
FIG. 7 schematically, a flowchart for a sequential motor control with error correction in the next step for adjusting the actuator of the air vent.

In FIG. 6, a flowchart that is realizable with the device according to the invention is shown schematically:

in step S1, the actuator of an air vent is manually adjusted;

in step S2, the manual adjustment of the actuator is detected with the aid of an apparatus for performing functional monitoring;

in step S3, the detection of a manual adjustment of the actuator is reported to a control apparatus;

in step S4, it is checked whether an automatic resetting of the actuator into a predefined or definable setpoint position is deactivated.

If, in step S4, it is detected that an automatic resetting of the actuator is not deactivated (NO), the motor-operated drive is actuated such that the actuator is reset to the predefined or definable setpoint position, specifically either immediately or after a predefined or definable time period or after a predefined or definable event occurs.

In order to reset the actuator to the predefined or definable setpoint position, the actual position of the actuator is first interrogated via the sensor system and compared to the setpoint position of the actuator (step S5).

As a function of the comparison, the drive is actuated by the control apparatus until the actual value of the position of the actuator (at least with a certain tolerance range) corresponds to the specified setpoint value (step S6). It should be noted here that step S6 constitutes a control loop.

If, on the other hand, an automatic resetting of the actuator is deactivated in step S4 (YES), it is checked in step S7 whether the deactivation of an automatic resetting of the actuator has possibly been cancelled again, for example by manually operating a corresponding operator control element. If the deactivation of this function is to be cancelled (YES), the process moves over to method step S5.

In FIG. 7, a further flowchart that is realizable with the device according to the invention is schematically shown.

In step S1, a command is issued for starting the motor-operated drive 1 and the measured value sensing with the aid of sensor system 4.

In step S2, a setpoint value interrogation is performed from a memory device associated with the control apparatus.

In the subsequent step S3, there is an interrogation of a sensor system 4, for example of a potentiometer belonging to the sensor system 4, with regard to the actual value of the actuator to be manipulated with the motor-operated drive 1.

In the subsequent step S4, the setpoint value is compared to the actual value of an evaluation apparatus belonging to the control apparatus. The result of the comparison then serves as the basis for calculating the number of motor steps which are still necessary in order to make the actual value correspond to the setpoint value.

In the next step S5, the calculated number of the still necessary motor steps is output as a signal to the actuator manipulated [with] the motor-operated drive 1.

It should be noted here that in the procedure shown in FIG. 7, the motor-operated drive 1 can in particular be designed as a stepping motor or that the motor-operated drive 1 can be actuated in the manner of a stepping motor, specifically in contrast to the other actuating concepts where the motor-operated drive 1 is rather driven in the manner of a servo motor. This is possible in particular because the flowchart schematically shown in FIG. 7 predicts the necessary motor steps.

Figure 8:
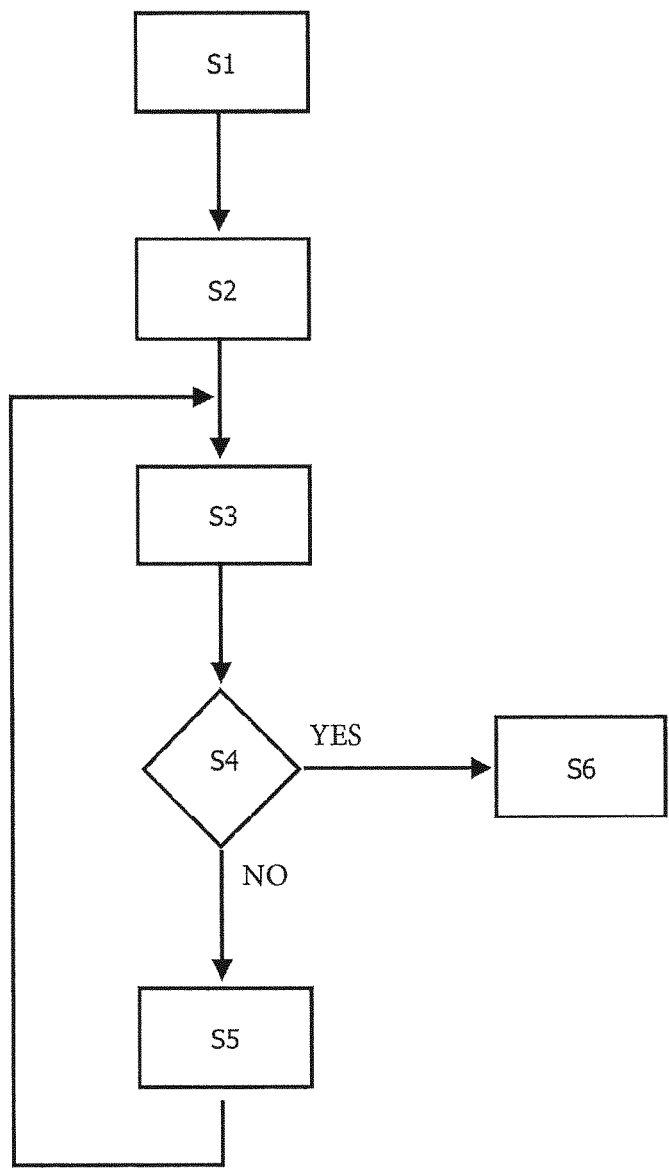
FIG. 8 schematically, a flowchart for a first embodiment of a sequential motor control with position control.

FIG. 8 schematically shows a flowchart for a sequential motor control with position control.

In step S1, a command is issued for starting the motor-operated drive 1 and the measured value sensing with the aid of sensor system 4.

In step S2, a setpoint value interrogation is performed from a memory device associated with the control apparatus.

In the subsequent step S3, there is an interrogation of a sensor system 4, for example of a potentiometer belonging to the sensor system 4, with regard to the actual value of the actuator manipulated with the motor-operated drive 1. In the subsequent step S4, the setpoint value is compared to the actual value of an evaluation apparatus belonging to the control apparatus. If the result of this comparison reveals that the actual value corresponds to or at least substantially corresponds to the setpoint value, the flowchart proceeds to the next step S6, where a message goes to the control apparatus to the effect that the setpoint position has been reached, so that the motor-operated drive 1 can be stopped.

If, on the other hand, it is determined in step S4 that the actual value does not (yet) at least sufficiently correspond to the setpoint value, the method proceeds to the next step S5, where a further stepping signal is output to the motor-operated drive 1. Steps S3, S4, and possibly S5 are subsequently repeated, specifically until the actual value ultimately sufficiently corresponds to the setpoint value, and the setpoint position is thus reached and the motor-operated drive can be stopped.

Figure 9:
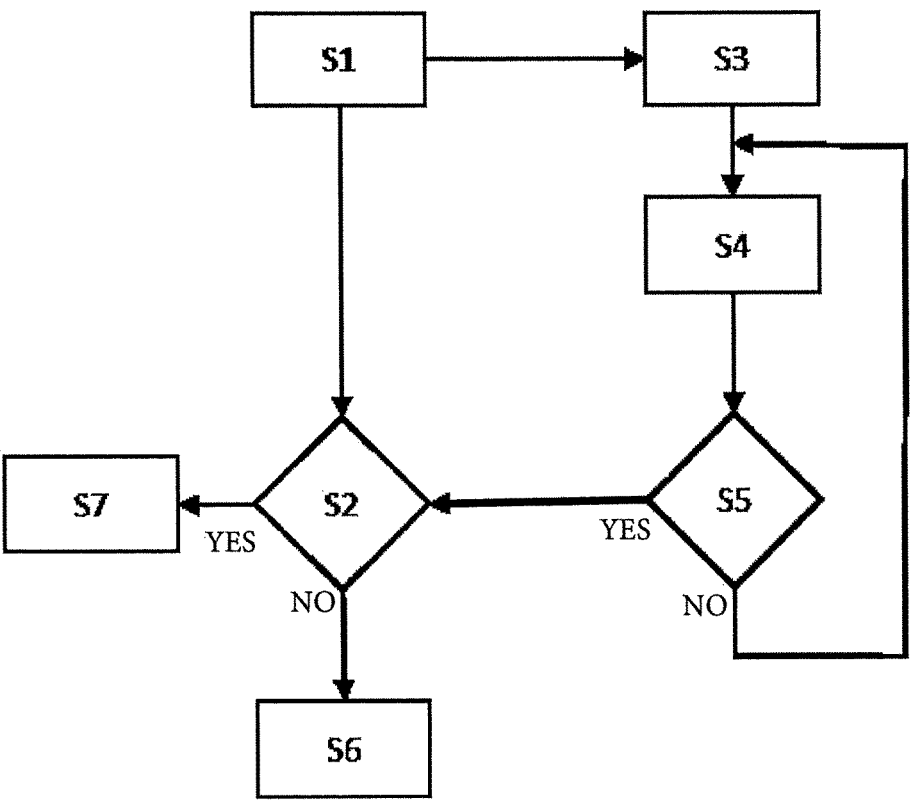
FIG. 9 schematically, a flowchart for a parallel motor control for adjusting the actuator of the air vent.

FIG. 9 schematically shows a flowchart for a parallel drive control for adjusting the actuator of the air vent 3.

In step S1, a command is issued for starting the motor-operated drive 1 and the measured value sensing with the aid of sensor system 4.

In step S3, a setpoint value interrogation is performed from a memory device associated with the control apparatus.

In the subsequent step S4, there is an interrogation of a sensor system 4, for example of a potentiometer belonging to the sensor system 4, with regard to the actual value of the actuator manipulated with the motor-operated drive 1.

In the subsequent step S5, the setpoint value is compared to the actual value of an evaluation apparatus belonging to the control apparatus. If the result of this comparison reveals that the actual value corresponds to or at least substantially corresponds to the setpoint value, a stop command is generated and the flowchart returns to step S2.

In step S2, it is interrogated whether or not a stop command from step S5 is present. If it is detected in step S2 that a stop command from step S5 is present, the method proceeds to step S7, wherein, in step S7, a message goes to the control apparatus to the effect that the setpoint position has been reached, so that the motor-operated drive 1 can be stopped.

On the other hand, if the check in step S2 reveals that such a stop command from step S5 is not (yet) present, the method proceeds to step S6, wherein, in step S6, a further stepping signal is output to the motor-operated drive 1.

If, however, the comparison made in step S5 shows that the actual value does not correspond or at least substantially does not correspond, the flowchart returns to step S4, and there is an interrogation of a sensor system 4, for example of a potentiometer belonging to the sensor system 4, with regard to the actual value of the actuator manipulated with the motor-operated drive 1.

Figure 10:
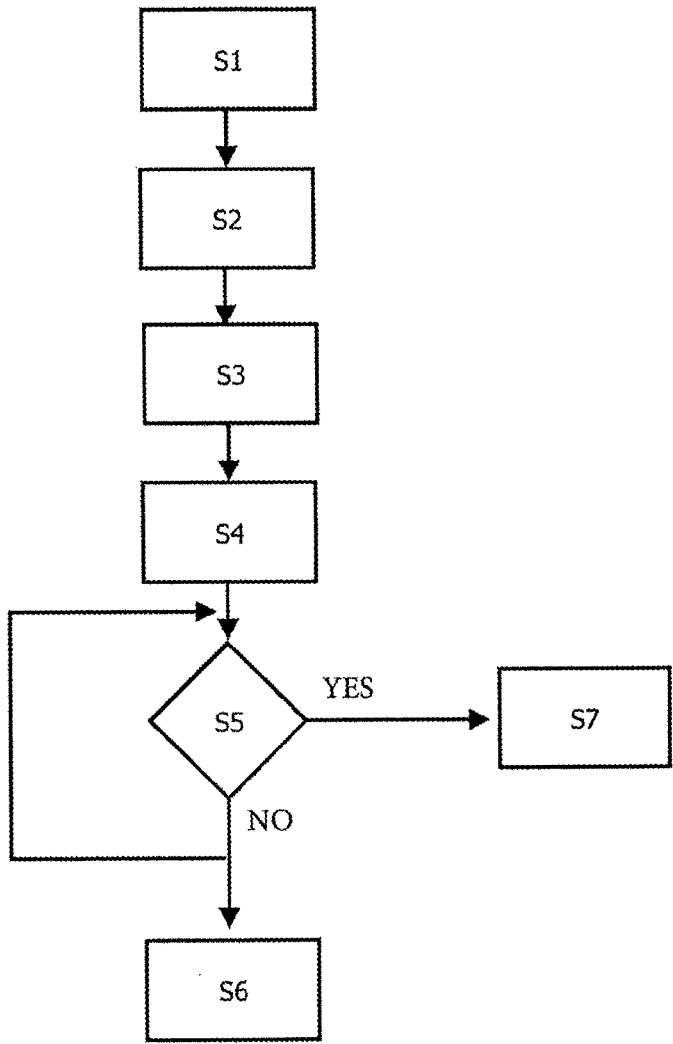
FIG. 10 schematically, a flowchart for a second embodiment of a sequential motor control with position control.

FIG. 10 schematically shows a flowchart for a further sequential motor control with position control.

In step S1, a command is issued for starting the motor-operated drive 1 and the measured value sensing with the aid of sensor system 4.

In step S2, a setpoint value interrogation is performed from a memory device associated with the control apparatus.

In the subsequent step S3, there is an interrogation of a sensor system 4, for example of a potentiometer belonging to the sensor system 4, with regard to the actual value of the actuator manipulated with the motor-operated drive 1.

In the subsequent step S4, the setpoint value is compared to the actual value of an evaluation apparatus belonging to the control apparatus. The result of the comparison then serves as the basis for calculating the number of motor steps which are still necessary in order to make the actual value correspond to the setpoint value.

In step S5, it is determined whether or not the setpoint value corresponds to the actual value.

If the result of this comparison reveals that the actual value corresponds to or at least substantially corresponds to the setpoint value, the flowchart proceeds to the next step S7, where a message goes to the control apparatus to the effect that the setpoint position has been reached, so that the motor-operated drive 1 can be stopped.

If, on the other hand, it is determined in step S5 that the actual value does not (yet) at least sufficiently correspond to the setpoint value, the method proceeds to step S6, where a further stepping signal is output to the motor-operated drive 1.

Steps S5, S7, and possibly S6 are subsequently repeated, specifically until the actual value ultimately sufficiently corresponds to the setpoint value, and the setpoint position is thus reached and the motor-operated drive can be stopped.

The invention is not limited to the exemplary embodiment shown in the drawings, but rather results when all of the features disclosed herein are considered together.

In particular, the invention is not limited to embodiments in which the sensor system comprises absolute value sensors. Rather, it is also conceivable, for example, to sense the actual position of the actuator directly via relative value sensors (for example, encoders). Such relative-value sensors can also detect a blocking or adjustment of the actuator; however, relative-value sensors would need to be calibrated accordingly at every restart.

The invention claimed is:

1. A device for manipulating an actuator, in the form of a throttle valve or closure flap, of an air vent, wherein the device comprises:

a motor-operated drive, which is or can be coupled mechanically to the actuator in such a way that the actuator can be adjusted relative to a housing of the air vent by activating the motor- operated drive; and a sensor system for sensing a real actual position of the actuator relative to the housing of the air vent; and an apparatus for performing functional monitoring of the motor-operated drive, which apparatus is configured to interrupt actuation of the motor-operated drive or to cancel actuation of the motor-operated drive or to act on actuation of the motor-operated drive if the actual position of the actuator sensed by the sensor system does not correspond to a predefined or definable set-point position or does not fall within in a predefined or definable tolerance range around the setpoint position;

wherein the motor-operated drive is located within a drive housing, wherein an output shaft is coupled to the motor-operated drive and extends from a first side of the drive housing, wherein the actuator is coupled to be driven by the output shaft;

wherein the sensor system comprises a Hall sensor element mounted on an outer surface of the first side of the drive housing and positioned alongside the output shaft to detect a rotational position of the output shaft and thus the real actual position of the actuator coupled to the output shaft.

2. The device as claimed in claim 1, wherein a control apparatus is provided for actuating the motor-operated drive according to a command which has been defined previously or input manually via an interface and corresponds to the setpoint position of the actuator, wherein the control apparatus is designed to compare the actual position of the actuator, sensed by the sensor system, with the setpoint position and to actuate the motor-operated drive in such a way that the actual position corresponds to the setpoint position or falls within the tolerance range about the setpoint position.

3. The device as claimed in claim 1, wherein the apparatus for performing functional monitoring is assigned an interface for optically and/or acoustically outputting a status message and/or warning message.

4. The device as claimed in claim 1, wherein the apparatus for performing functional monitoring is designed to detect, with the aid of the sensor system, a manually effected adjustment of the actuator relative to the housing of the air vent.

5. The device as claimed in claim 4, wherein a control apparatus is provided for actuating the motor-operated drive according to a command which has been defined previously or input manually via an interface and corresponds to the setpoint position of the actuator, wherein the control apparatus is designed to initiate automatically predefined or definable measures on the basis of the detection of a manual adjustment of the actuator relative to the housing of the air vent, and to actuate the motor-operated drive in such a way:

that the actuator is reset into the setpoint position, either immediately or after a predefined or definable time period; or that the actuator is not reset into the setpoint position, with the result that the manual adjustment of the actuator relative to the housing of the air vent is accepted by the control apparatus, wherein the deactivation of automatic resetting of the actuator into the setpoint position applies until the deactivation of this function is cancelled by activating an operator control element.

6. The device as claimed in claim 5, wherein the control apparatus is designed to learn, in an initial learning process, the setpoint position of the actuator and/or the actuation of the motor-operated drive, which is necessary to reset the actuator into the setpoint position, by means of the detection, brought about with the aid of the sensor system, of a manually effected adjustment of the actuator relative to the housing of the air vent.

7. The device as claimed in claim 6, wherein the apparatus is designed to perform functional monitoring of the motor-operated drive, to sense a manual movement of the motor-operated drive which is brought about during manual adjustment of the actuator, by sensing a voltage induced by the motor-operated drive, during a manual movement of said drive, or by sensing a corresponding current, and wherein the apparatus for performing functional monitoring of the motor-operated drive is also designed to determine an actual position of the actuator relative to the housing of the air vent on the basis of the voltage induced by the motor-operated drive, during a manual movement of said drive, and sensed by the apparatus for performing functional monitoring, or on the basis of the corresponding current.

8. The device as claimed in claim 1, wherein the Hall sensor element has at least two Hall elements each with a measuring direction which is perpendicular to the other, wherein the at least two Hall elements are positioned together or individually.

9. The device as claimed in claim 1, wherein the Hall sensor element has at least two Hall elements each with a measuring direction which is perpendicular to the other, wherein the at least two Hall elements are positioned together or individually, and wherein the at least two Hall elements are designed to detect a magnet with respective North and South poles, wherein the magnet is located on or in the output shaft or surrounds the output shaft as an annular magnet, with the result that any position of the output shaft can be recorded as an absolute value on the basis of the values acquired with the at least two Hall elements.

10. The device as claimed in claim 1, wherein the motor-operated drive has a stepping motor, in the form of an electronically commutating electric motor, wherein the Hall sensor element is configured as an absolute value sensor that is connected to a control apparatus to determine a rotor position of the stepping motor from the absolute value information of the absolute value sensor.

11. A ventilation system having at least one air vent, to which a device for manipulating an actuator, in the form of an air-directing element, is assigned, wherein the device for manipulating the actuator is a device as claimed in claim 1.

12. The device of claim 1, wherein the actuator, in the form of the throttle valve or closure flap, is mounted on an air vent housing such that the actuator, in the form of the throttle valve or closure flap, is movable relative to the air vent housing.

13. A method for manipulating an actuator, in the form of a throttle valve or closure flap, of an air vent, wherein the actuator is designed as an air-directing element or as part of a package of air-directing elements, and wherein the method comprises the following method steps:

i) outputting a command for activating or starting a motor-operated drive, which is or can be mechanically coupled to the actuator in such a way that the actuator can be adjusted relative to the housing of the air vent by activating the motor-operated drive, and direct sensing of a real actual position of the actuator relative to the housing of the air vent with the aid of a sensor system, wherein the motor-operated drive is located within a drive housing, wherein an output shaft is coupled to the motor-operated drive and extends from a first side of the drive housing, wherein the actuator is coupled to be driven by the output shaft, wherein the sensor system comprises a Hall sensor element mounted on an outer portion of the first side of the drive housing and positioned alongside the output shaft to detect a rotational position of the output shaft and thus the real actual position of the actuator coupled to the output shaft;

ii) interrogating a setpoint position of the actuator relative to the housing of the air vent from a memory device which is assigned to the control apparatus; and iii) comparing the sensed actual position of the actuator relative to the housing of the air vent with the interrogated setpoint position of the actuator relative to the housing of the air vent, wherein, in that in step iii) a number of possibly still necessary motor steps of the motor-operated drive is calculated on the basis of the result of the comparison of the sensed actual position of the actuator with the interrogated setpoint position of the actuator, in order to make the actual position of the actuator correspond to the setpoint position of the actuator, or correspond at least substantially thereto, wherein the calculated number of possibly still necessary motor steps is subsequently output as a signal to the motor-operated drive, in order to manipulate the actuator correspondingly.

14. The method of claim 13, wherein the actuator, in the form of the throttle valve or closure flap, is mounted on an air vent housing such that the actuator, in the form of the throttle valve or closure flap, is movable relative to the air vent housing.

15. A device for manipulating first and second actuators, each in the form of a throttle valve or closure flap, of an air vent, wherein the device comprises:

a motor-operated drive, which is or can be coupled mechanically to each of the first actuator and the second actuator in such a way that each of the first actuator and the second actuator can be adjusted relative to a housing of the air vent by activating the motor-operated drive; and a sensor system for sensing a real actual position of each of the first actuator and the second actuator relative to the housing of the air vent; and an apparatus for performing functional monitoring of the motor-operated drive, which apparatus is configured to interrupt actuation of the motor-operated drive or to cancel actuation of the motor-operated drive or to act on actuation of the motor-operated drive if the actual position of the first actuator or the second actuator sensed by the sensor system does not correspond to a predefined or definable setpoint position or does not fall within in a predefined or definable tolerance range around the setpoint position;

wherein the motor-operated drive is located within a drive housing, wherein a first output shaft is coupled to the motor-operated drive and extends through a first side of the drive housing, wherein the first actuator is coupled to be driven by the first output shaft, wherein a second output shaft is coupled to the motor-operated drive and extends through a second side of the drive housing, wherein the second actuator is coupled to be driven by the second output shaft wherein the sensor system comprises (i) a first Hall sensor element mounted on an outer surface of the first side of the drive housing and positioned alongside the first output shaft to detect a rotational position of the first output shaft and thus the real actual position of the first actuator and (ii) a second Hall sensor element mounted on an outer surface of the second side of the drive housing and positioned alongside the second output shaft to detect a rotational position of the second output shaft and thus the real actual position of the second actuator.

16. The device as claimed in claim 15, wherein:

the first Hall sensor element has at least two Hall elements each with a measuring direction which is perpendicular to the other; and the second Hall sensor element has at least two Hall elements each with a measuring direction which is perpendicular to the other.

* * * * *